(12) United States Patent
Georgoulias et al.

(10) Patent No.: US 8,800,677 B2
(45) Date of Patent: Aug. 12, 2014

(54) AERATOR HOLE SPACING CONTROL WITH LOCKOUT

(75) Inventors: Chris Michael Georgoulias, Raleigh, NC (US); Marquez Giovonnie Perkins, Apex, NC (US); Bradley P. Aldridge, Raleigh, NC (US)

(73) Assignee: Deere & Company, Moline, IL (US)

( * ) Notice: Subject to any disclaimer, the term of this patent is extended or adjusted under 35 U.S.C. 154(b) by 320 days.

(21) Appl. No.: 13/435,534

(22) Filed: Mar. 30, 2012

(65) Prior Publication Data

US 2013/0255976 A1    Oct. 3, 2013

(51) Int. Cl.
*A01B 41/06*    (2006.01)

(52) U.S. Cl.
USPC .................................. 172/2; 172/21

(58) Field of Classification Search
USPC .............................. 172/2, 3, 21, 22
See application file for complete search history.

(56) References Cited

U.S. PATENT DOCUMENTS

| | | | |
|---|---|---|---|
| 4,602,687 A | 7/1986 | Hansen | |
| 4,606,411 A | 8/1986 | Classen | |
| 4,645,012 A | 2/1987 | Hansen et al. | |
| 4,662,456 A | 5/1987 | Classen | |
| 4,750,565 A | 6/1988 | Hansen et al. | |
| 4,753,298 A | 6/1988 | Hansen et al. | |
| 4,776,404 A | 10/1988 | Rogers et al. | |
| 4,867,244 A | 9/1989 | Cozine et al. | |
| 5,101,745 A * | 4/1992 | Podevels et al. | 111/127 |
| 5,207,278 A | 5/1993 | Hatlen | |
| 5,291,842 A * | 3/1994 | Sallstrom et al. | 111/127 |
| 5,570,746 A | 11/1996 | Jones et al. | |
| 5,709,272 A | 1/1998 | Jones et al. | |
| 6,041,869 A | 3/2000 | Lewis et al. | |
| 6,102,129 A | 8/2000 | Classen | |
| 6,561,282 B2 | 5/2003 | Smith | |
| 6,948,568 B2 | 9/2005 | Banks | |
| 7,096,969 B2 | 8/2006 | Petersen et al. | |
| 7,267,181 B2 | 9/2007 | Banks | |
| 7,293,612 B1 | 11/2007 | Petersen et al. | |
| 7,472,759 B2 | 1/2009 | Petersen | |
| 7,669,667 B2 | 3/2010 | Petersen et al. | |
| 7,730,960 B1 | 6/2010 | Knight et al. | |
| 8,543,295 B2 * | 9/2013 | Bryant et al. | 701/42 |
| 2005/0023009 A1 | 2/2005 | Banks | |
| 2011/0005783 A1 | 1/2011 | Livingstone | |
| 2011/0213530 A1 | 9/2011 | Hunt et al. | |
| 2011/0288729 A1 | 11/2011 | McKinney | |
| 2013/0075117 A1 * | 3/2013 | Hall et al. | 172/22 |
| 2013/0255975 A1 * | 10/2013 | Aldridge et al. | 172/2 |
| 2013/0255979 A1 * | 10/2013 | Georgoulias et al. | 172/22 |

FOREIGN PATENT DOCUMENTS

| | | |
|---|---|---|
| EP | 0861578 | 9/1998 |
| EP | 0661578 | 10/2001 |
| EP | 2260686 A1 | 12/2010 |
| EP | 2572564 A2 | 3/2013 |
| WO | 2004016070 | 8/2004 |

OTHER PUBLICATIONS

European Search Report dated Jun. 28, 2013 (6 pages).

* cited by examiner

*Primary Examiner* — Jamie L McGowan

(57) ABSTRACT

An aerator hole spacing control with lockout prevents operation of a coring head except if the speed control is at a limited range of preset coring speed positions between the minimum and the maximum. Electrical signals corresponding to a coring speed may be provided to a controller that allows the coring head to be lowered to an operating position only if the signals are within the limited range of preset coring speed positions.

15 Claims, 9 Drawing Sheets

AERATOR HOLE SPACING CONTROL WITH LOCKOUT

FIELD OF THE INVENTION

This invention relates to aerators for aerating ground surfaces. More specifically, the invention relates to a walk-behind aerator with a hole spading control.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have tines that repeatedly penetrate the ground surface, forming a plurality of holes so that the ground surface is aerated, to improve growth of the grass or other material and enhance the condition of the surface for playing purposes.

Aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical, are hollow or solid, and produce holes by pulling up plugs or cylindrical cores of soil as the tines move by rotation of the flywheel.

The hole spacing of an aerator may need to be changed if there are variable ground conditions, including variations in turf, soil, moisture and temperature over time and between different locations. Most aerators have a drive system that moves the aerator at a designated speed while rotating the coring head at a translated RPM, and thereby produces a pattern that approximates the selected spacing. For example, hole spacing settings can be and typically are set anywhere between 0 and 6 inches.

Existing walk-behind aerators have traction drives that must be stopped so that the aerator is stationary before an operator can increase or decrease the hole spacing, or that cannot change the hole spacing in either direction while the aerator is moving. For example, to increase or decrease the hole spacing, the operator may be required to return the operator presence/traction control bail to the neutral position to stop the aerator traction drive, and then adjust hole spacing using shift levers or other controls that may be outside the operator station.

An aerator hole spacing control is needed that can be used to increase or decrease the hole spacing without stopping the aerator traction drive. A hole spacing control is needed that may be used from the operator station while the aerator traction drive continues to move the aerator forward and the coring head continues to operate. Additionally, an aerator hole spacing control with lockout is needed so that a golf course supervisor or superintendent may preset the hole spacing of the aerator for a golf course or playing field, and that hole spacing cannot be changed, but will be consistently applied by operators.

SUMMARY OF THE INVENTION

An aerator hole spacing control with lockout prevents operation of a coring head unless electrical signals for the speed/hole spacing are within a limited range of preset coring speed positions. The signals may be provided by an electrical sensor such as a rotary potentiometer or proximity switch linked to the control arm. A controller may allow the coring head to be lowered to an operating position only if the signals are within the limited range of preset coring speed positions. A golf course supervisor or superintendent may set the hole spacing for a golf course or playing field, and that same hole spacing will be consistently applied by the machine without change by operators.

DESCRIPTION OF THE PREFERRED EMBODIMENT

Figure 1:
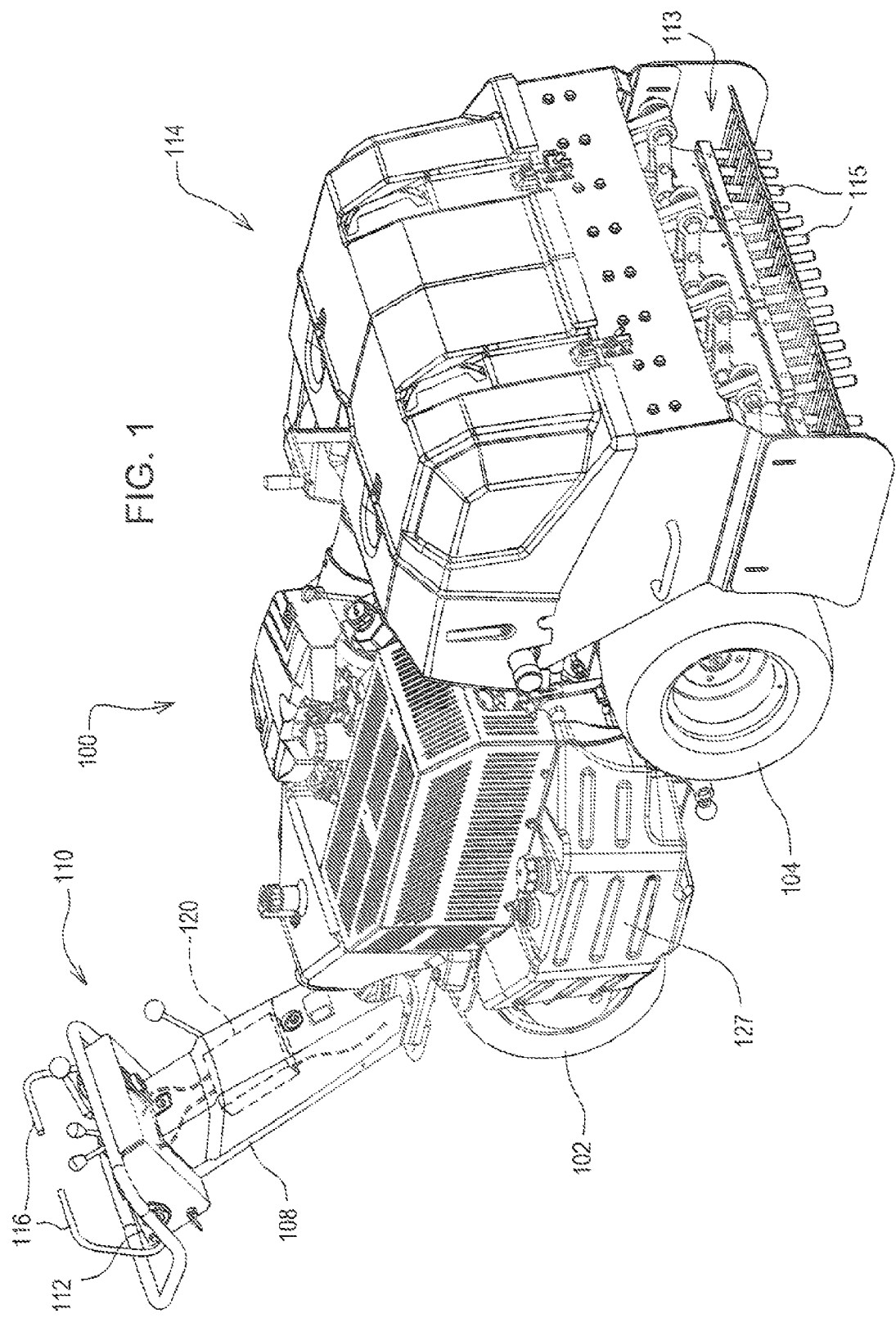
FIG. 1 is a perspective view of an aerator having hole spacing control with lockout according to a preferred embodiment of the invention.

In one embodiment shown in FIG. 1, walk-behind aerator 100 may be supported for movement over the ground by a single steerable wheel 102, which may or may not be driven, and a pair of driven wheels 104. The frame of the aerator may have a neck 108 extending upwardly therefrom, and the single steerable wheel may be carried in a pivotal yoke that can rotate about a vertical pivot axis attached to the neck. An upwardly and forwardly extending handle assembly 110 may be coupled to the pivotal yoke that carries the front wheel, and may include control panel 112. An operator may walk ahead of the aerator and steer the vehicle by using the handle assembly to pivot the single steerable front wheel about the vertical pivot axis.

In one embodiment, coring head 114 may be mounted on the rear of the aerator, either behind the rear drive wheels and tires, between the rear drive wheels and tires, or adjacent the rear axle(s). The coring head may carry a plurality of tine assemblies 113 that reciprocate up and down by rotation of a crankshaft. Each tine assembly may have a plurality of coring tines 115 that are driven into the ground and produce holes for the purpose of aerating the turf. Each tine assembly may include a rubber dampener system that absorbs the forward motion of the aerator to help improve hole quality by minimizing hole elongation. In FIG. 1, the coring head is shown in the lowered or operating position.

In one embodiment, the aerator may have an internal combustion engine supported on the frame that may be used to operate coring head 114, and a fuel tank 127. The internal combustion engine also may provide traction drive for the rear wheels through a mechanical transmission, or through a hydrostatic transmission with a pump to supply pressurized fluid to a single hydraulic motor or pair of hydraulic motors for rotating the rear wheels. Alternatively, the internal combustion engine may drive an alternator or generator to generate electric power for electric traction drive motors. For example, each electric traction drive motor may independently rotate each wheel.

In one embodiment, the operator may operate the traction drive to move the aerator forward or in reverse by moving traction bail 116 in either the forward or reverse direction. The traction bail may be a single lever or a pair of levers pivotably mounted to the sides of the operator controls on the handle assembly of the aerator. The traction bail may be biased to a central or neutral position when released by the operator.

The aerator described in this application may be provided with a hydrostatic traction drive that can move the machine in the forward direction at a coring ground speed while the coring head is operating, or in the reverse direction while the coring head is not operating. Additionally, the hydrostatic traction drive can move the aerator in the forward direction at a higher transport speed while the coring head is not operating. An operator typically may walk in front of the aerator as it moves in the forward direction. However, those skilled in the art will understand that the aerator with low fuel level control of this invention is not limited to aerators with the same forward and reverse designations used in this application, but is intended to include any other walk behind aerators.

Figure 2:
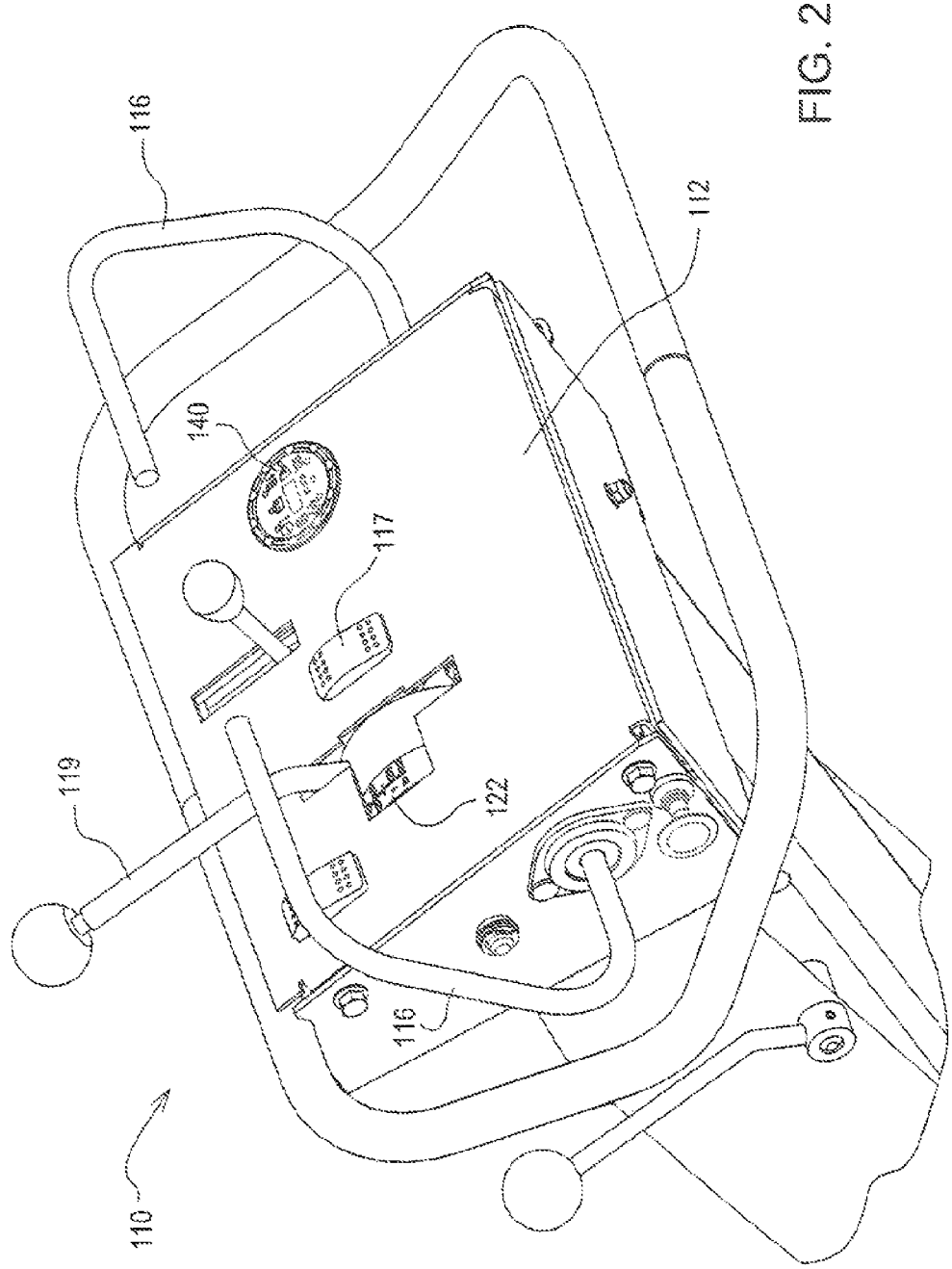
FIG. 2 is a perspective view of operator controls for an aerator having hole spacing control with lockout according to a preferred embodiment of the invention.
Figure 3:
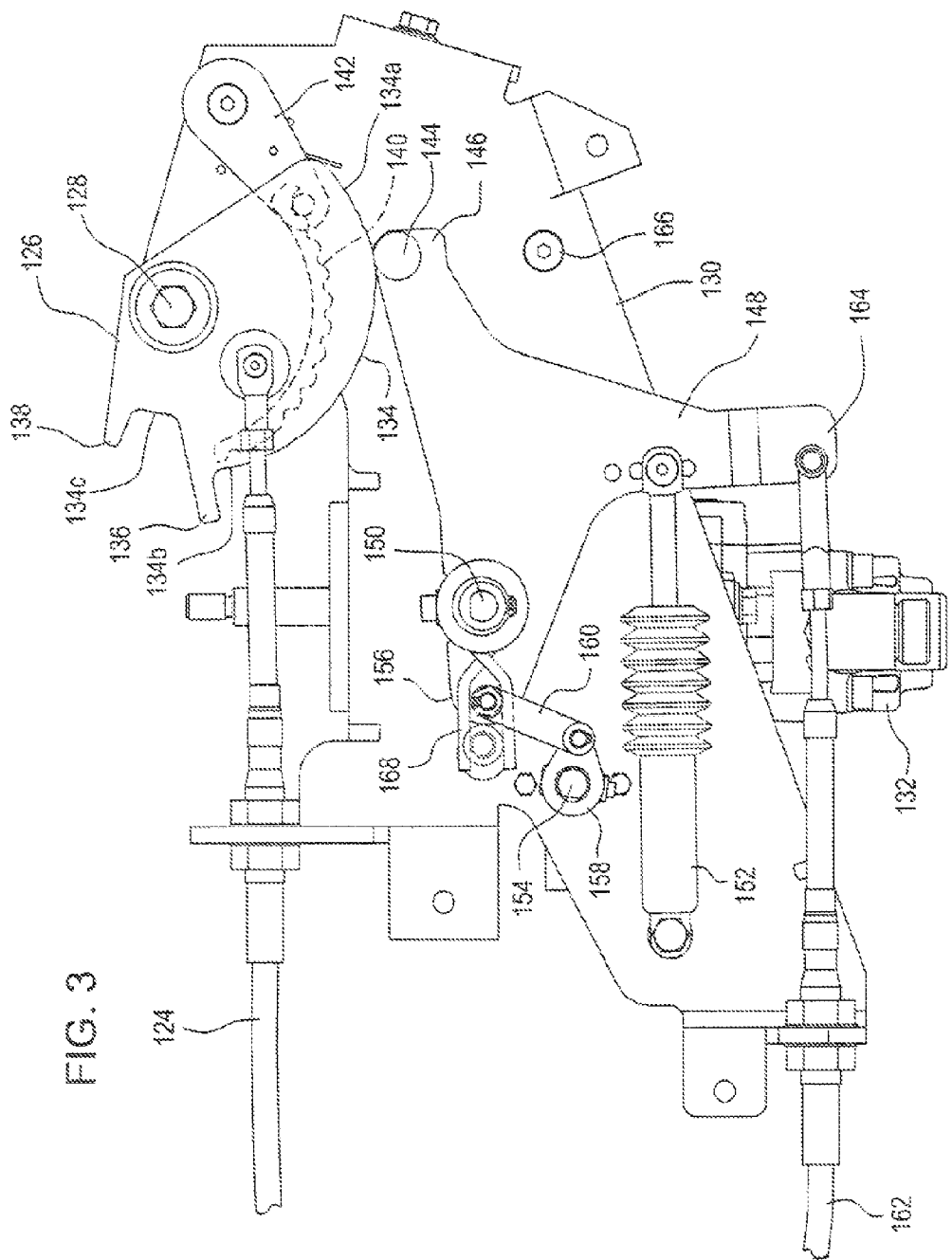
FIG. 3 is a top view of an aerator hole spacing control with lockout at a minimum coring speed position according to a first embodiment of the invention.
Figure 4:
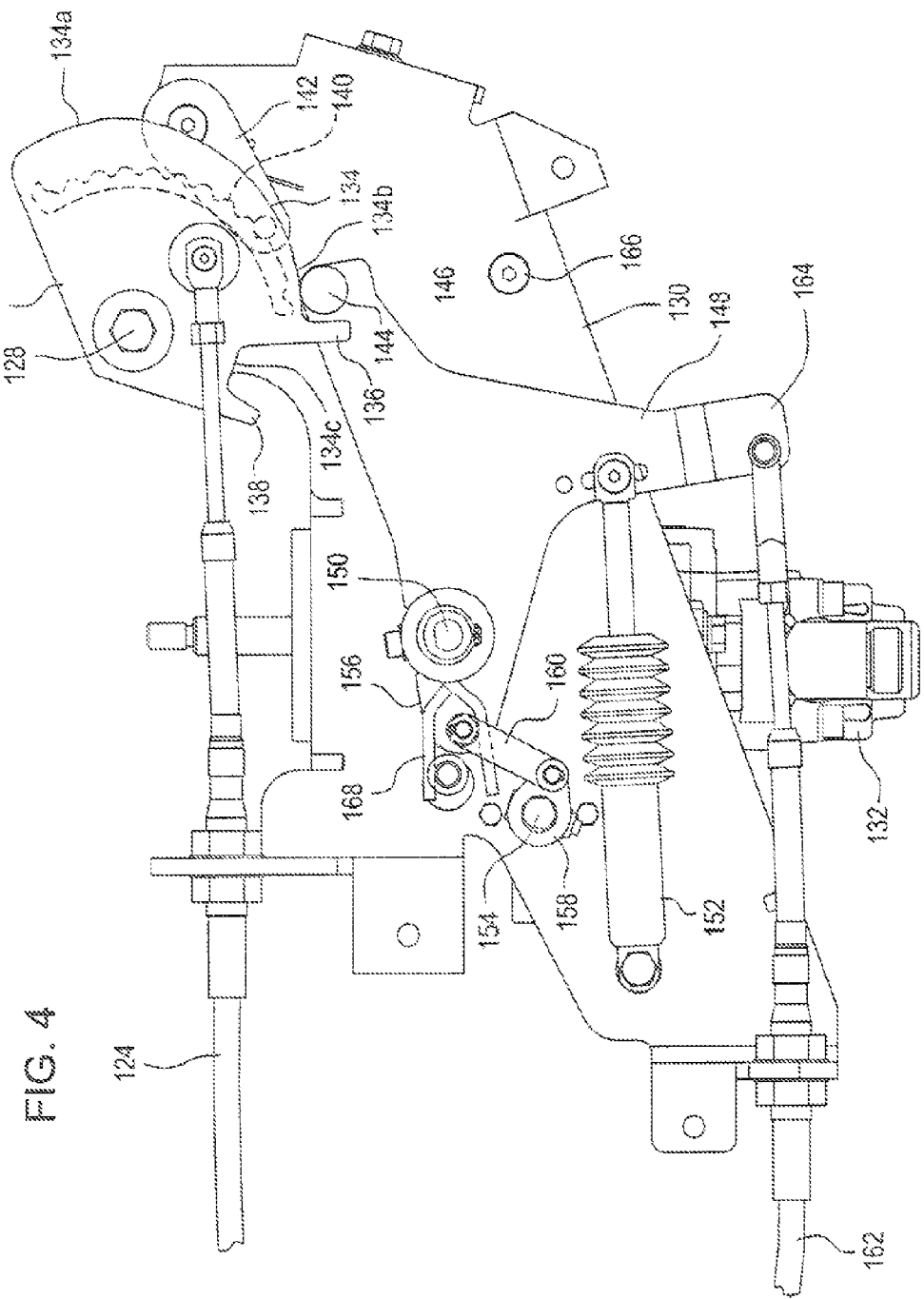
FIG. 4 is a top view of an aerator hole spacing control with lockout at a maximum coring speed position according to a first embodiment of the invention.
Figure 9:
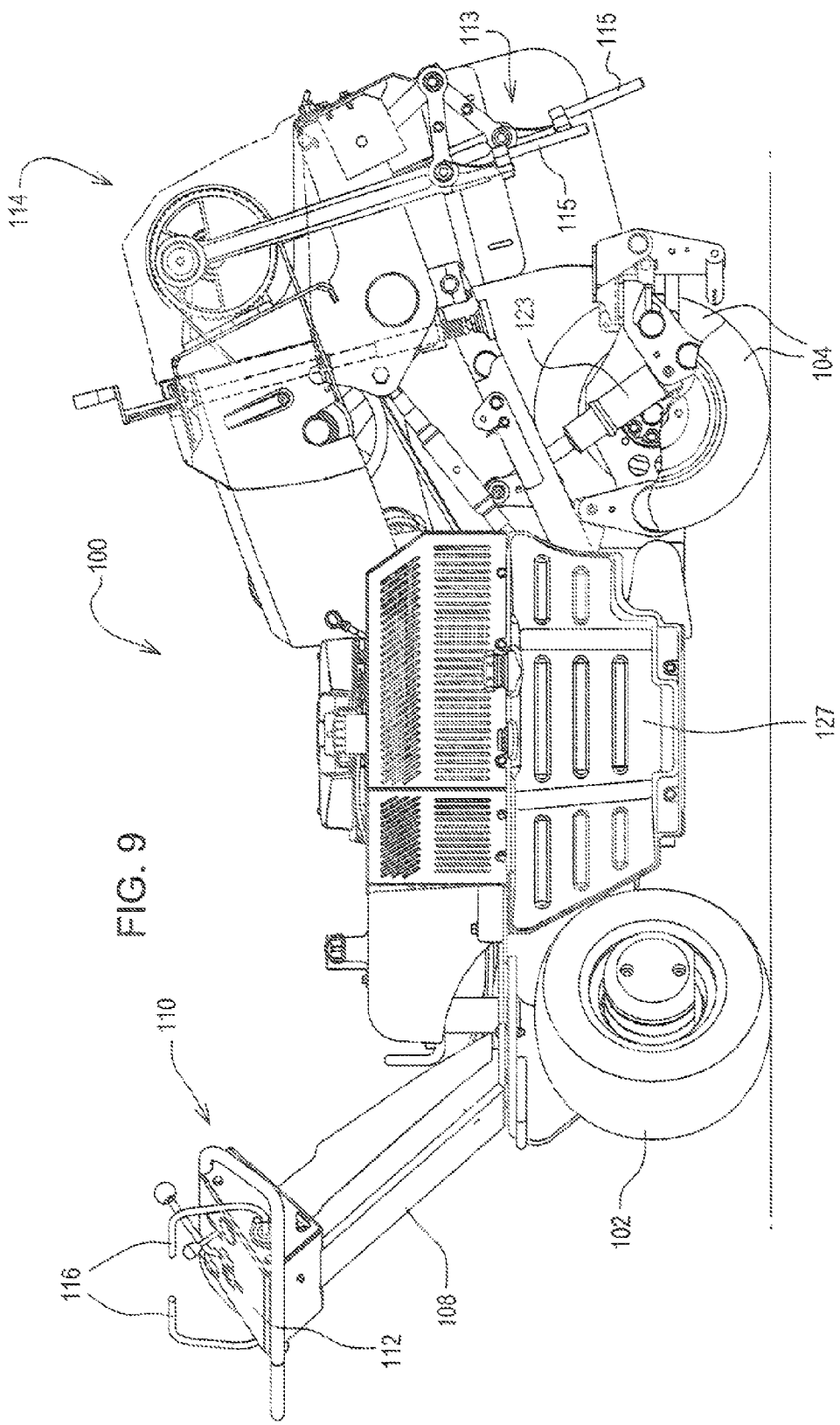
FIG. 9 is a side view of an aerator having hole spacing control with lockout according to an embodiment of the invention.

In one embodiment, the aerator may include a hydraulic lift and lower system to raise the coring head to a transport position and lower the coring head to an operating or coring position. For example, the coring head lift and lower system may include a hydraulic circuit that may extend or retract lift cylinder 123 shown in FIG. 9. As shown in FIG. 2, the aerator may include switch 117 on control panel 112 that an operator may actuate to raise and lower the coring head. Switch 117 may be electrically connected to controller 120. As used herein, the controller refers to any electric circuit and/or combination of electrical switches that is capable of the aerator hole spacing function. In response to actuation of the switch, the controller or other electrical circuit may provide a signal to a solenoid valve in the hydraulic circuit to extend or retract cylinder 123. Alternatively, the coring head lift and lower system may include an electrical or electro-mechanical device to raise and lower the coring head.

In one embodiment, the operator may increase or decrease the forward or coring ground speed while the aerator is moving and the coring head is operating. Increasing or decreasing the coring ground speed of the aerator changes the hole spacing. The operator may change the coring ground speed by moving speed control lever 119 to any position between a minimum speed setting and a maximum speed setting. The speed control lever may be pivotably mounted on the operator controls 112 of aerator handle assembly 110.

In one embodiment, operator controls 112 may include speed display or dial 122 showing the forward ground speed or hole spacing of the aerator while the coring head is operating. The speed display or dial may indicate where the speed control lever is positioned along a plurality of discrete or continuously variable speed settings corresponding to hole spacing settings. For example, the speed display or dial may indicate if the speed control lever is at one of multiple hole spacing settings between a minimum of about one inch and a maximum of about four inches.

In one embodiment, as shown in FIGS. 3-7, speed control lever 119 may be connected by speed control cable 124 to speed control cam 126. The speed control cam may be pivotably mounted on pivot 128 to mounting plate 130 at or adjacent to hydrostatic pump 132. The speed control cam may have a cam surface 134 that may be smooth, or may have a plurality of shallow detents, and defines a curve that has a greater radius (spaced further from the pivot) at minimum coring speed position 134a, and a smaller radius (spaced closer to the pivot) at a maximum coring speed position 134b. Additionally, the speed control cam may have a cam surface 134c with a radius that is smaller than the maximum coring speed position, which defines a travel speed position. Cam follower 144 may contact the cam surface of the speed control cam at a location based on the position or setting of the speed control lever, between minimum coring speed position 134a shown in FIG. 3 and maximum coring speed position 134b shown in FIG. 4. Additionally, cam follower 144 may contact the cam surface at cam surface 134c which is the travel speed position. The cam follower may be any rigid or rotatable member, with or without a bearing, that may be secured to the control arm 148 so that it may follow the cam surface. The speed control cam may have a first stop or lobe 136 extending from the cam surface between the maximum coring speed position and the travel speed position, and a second stop or lobe 138 at the top end of the travel speed position.

In one embodiment, the speed control cam may have a plurality of detents on a second curved surface 140 adjacent or under the cam surface. The detents may be engaged by detent lever 142 to define multiple discrete settings for the speed control cam. For example, the detent lever may click into each detent representing ¼ inch hole spacing increments that also may be shown on the speed display or dial.

In one embodiment, cam follower 144 may follow the cam surface of the speed control cam based on the position or setting of the speed control lever. The cam follower may be attached to a first outer end 146 of pivoting member 148. For example, the pivoting member may be a control arm mounted on pump control shaft 150 which pivots to control the speed of hydrostatic pump 132 for the traction drive of the aerator, and to control whether the pump operates in forward, neutral or reverse. The pump may be connected by hydraulic lines to hydrostatic motors for each wheel. Optionally, damper 152 may be attached between the control arm and the mounting plate to help keep the cable shifting operation smooth and to prevent inertia-induced cable actuations. Alternatively, a cam surface may be provided on pivoting member or control arm 148, and a cam follower may be mounted to or provided on speed control cam 126.

In one embodiment, an electrical sensor such as rotary potentiometer 154 or a proximity switch may be mounted to mounting plate 130, and may be connected to second outer end 156 of control arm 148 by bell crank 158 and actuation lever 160. Alternatively, the electrical sensor may be mounted above pump shaft 150 without linkages, and connected directly to the pump shaft axis. The electrical sensor may be electrically connected to an electric logic circuit such as electronic controller 120, and may provide the controller with information regarding the position of the control arm. The electrical sensor monitors or senses the position of the pump shaft, so that the controller may know the approximate speed and direction of the aerator, and may prevent operating the coring head in certain modes such as in reverse or at transport speed. Additionally, as will be explained in more detail below, the controller may use the electrical sensor output to provide the hole spacing lockout feature, that allows the coring operation only at certain preset or pre-programmed spacing and speed settings.

Figure 7:
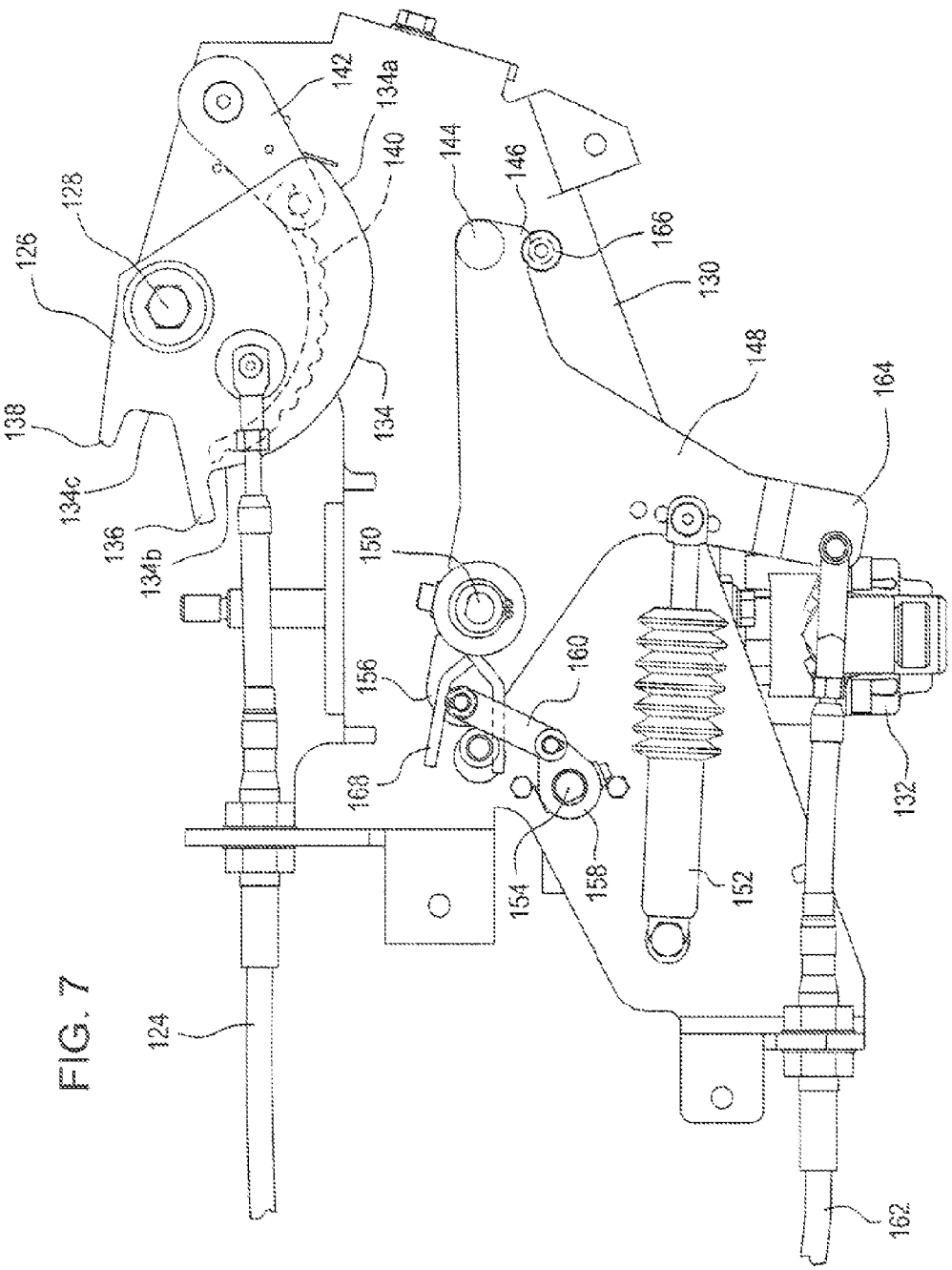
FIG. 7 is a top view of an aerator hole spacing control with lockout at a reverse position according to a first embodiment of the invention.

In one embodiment, the traction bail may be connected by traction control cable 162 to third outer end 164 of the traction control arm. If the operator puts the traction bail in the forward position, the traction control cable urges the control arm to pivot on the pump control shaft axis so that cam follower 144 is in contact with the cam surface 134 of speed control cam 126. If the operator puts the traction bail in the reverse position as shown in FIG. 7, the traction control cable urges the control cam to pivot on the pump control shaft axis until the third outer end 146 contacts a reverse direction stop. For example, reverse direction stop 166 may be on the mounting plate, or the steering column may provide a reverse stop. With the pump control shaft axis in this position, the hydrostatic pump is in reverse. Thus, if the operator puts the traction bail in the reverse position, the pump operates in reverse and the cam follower does not contact the speed control cam. Instead, the aerator may travel at a fixed reverse speed based on the position of the reverse direction stop. The reverse direction stop may be eccentric and may be rotated to adjust the fixed reverse speed.

Figure 5:
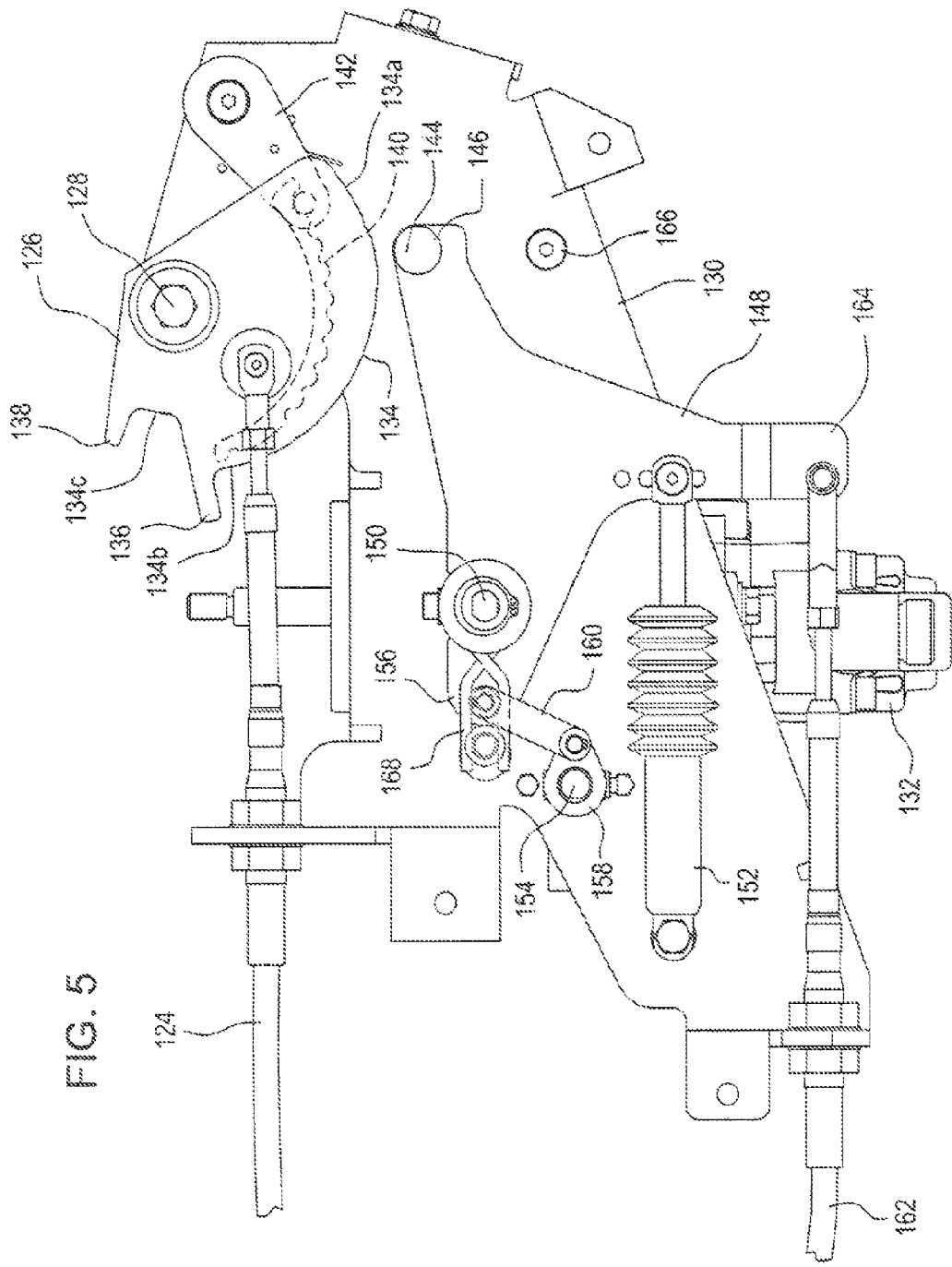
FIG. 5 is a top view of an aerator hole spacing control with lockout at a neutral position according to a first embodiment of the invention.

In one embodiment, return-to-neutral spring 168 may be fastened between the second outer end of the control arm and the mounting plate. The return-to-neutral spring may bias the control arm to the neutral position in which the pump control shaft axis and pump are in neutral. In the neutral position, as shown in FIG. 5, the cam follower does not contact the speed control cam. The traction bail also may be biased to return to the neutral position.

Figure 6:
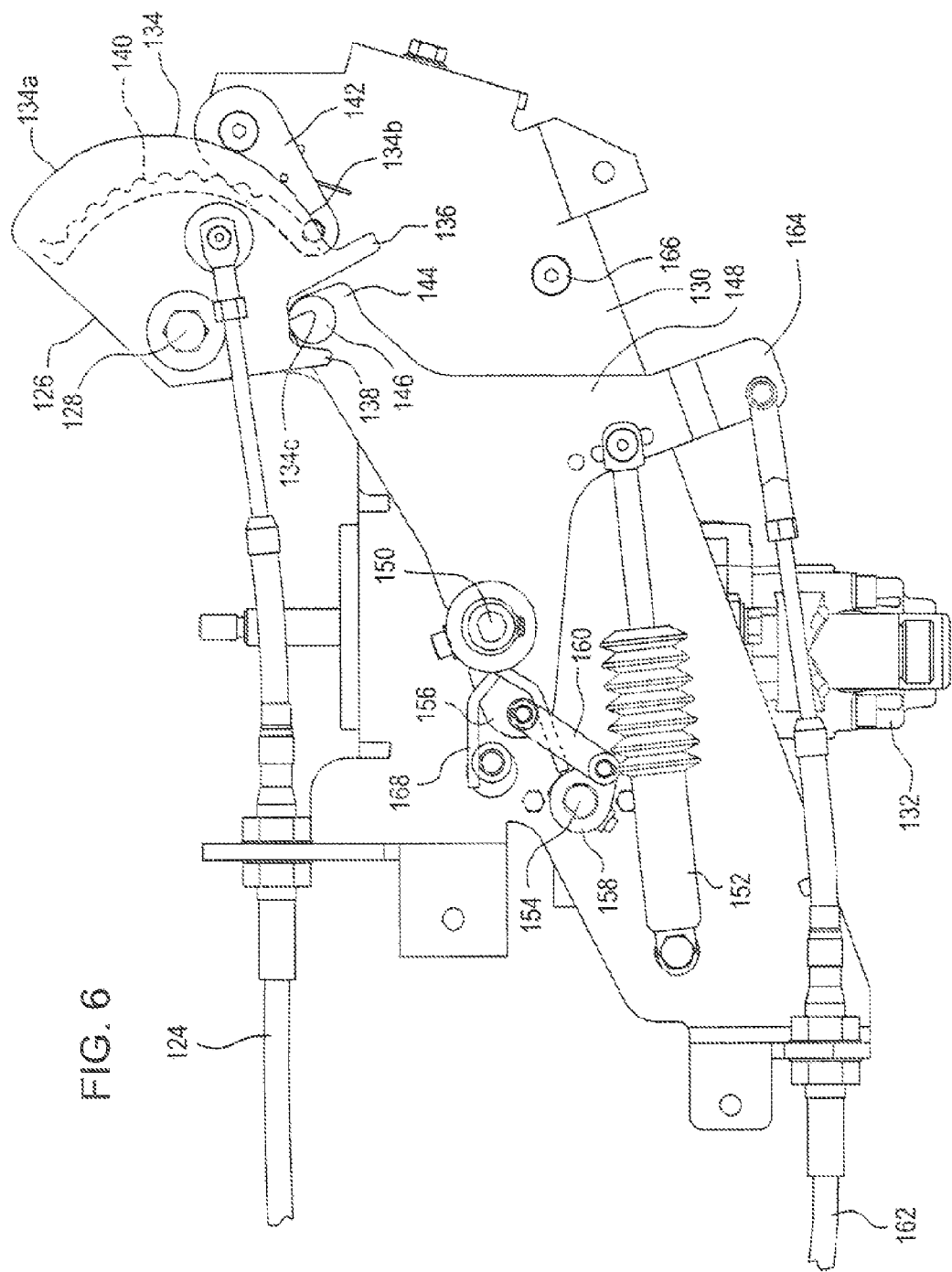
FIG. 6 is a top view of an aerator hole spacing control with lockout at a transport speed position according to a first embodiment of the invention.

In one embodiment, stop or lobe 136 prevents the operator from changing between the maximum coring speed and a higher transport speed, until he first returns the traction bail to the neutral position. Unless the traction bail is in the neutral position, the stop or lobe blocks the control arm from pivoting further on the pump control shaft to increase the pump speed. If the traction bail is in neutral, the operator then can move the speed control lever to the transport position because cam follower 144 does not contact stop or lobe 136. In the transport position, as shown in FIG. 6, the cam follower contacts the speed control cam at position 134c. Thus, the aerator may be moved at transport speed by releasing the bail so that the speed control is in neutral, before moving the speed control lever to the transport position and re-engaging the bail.

Figure 8:
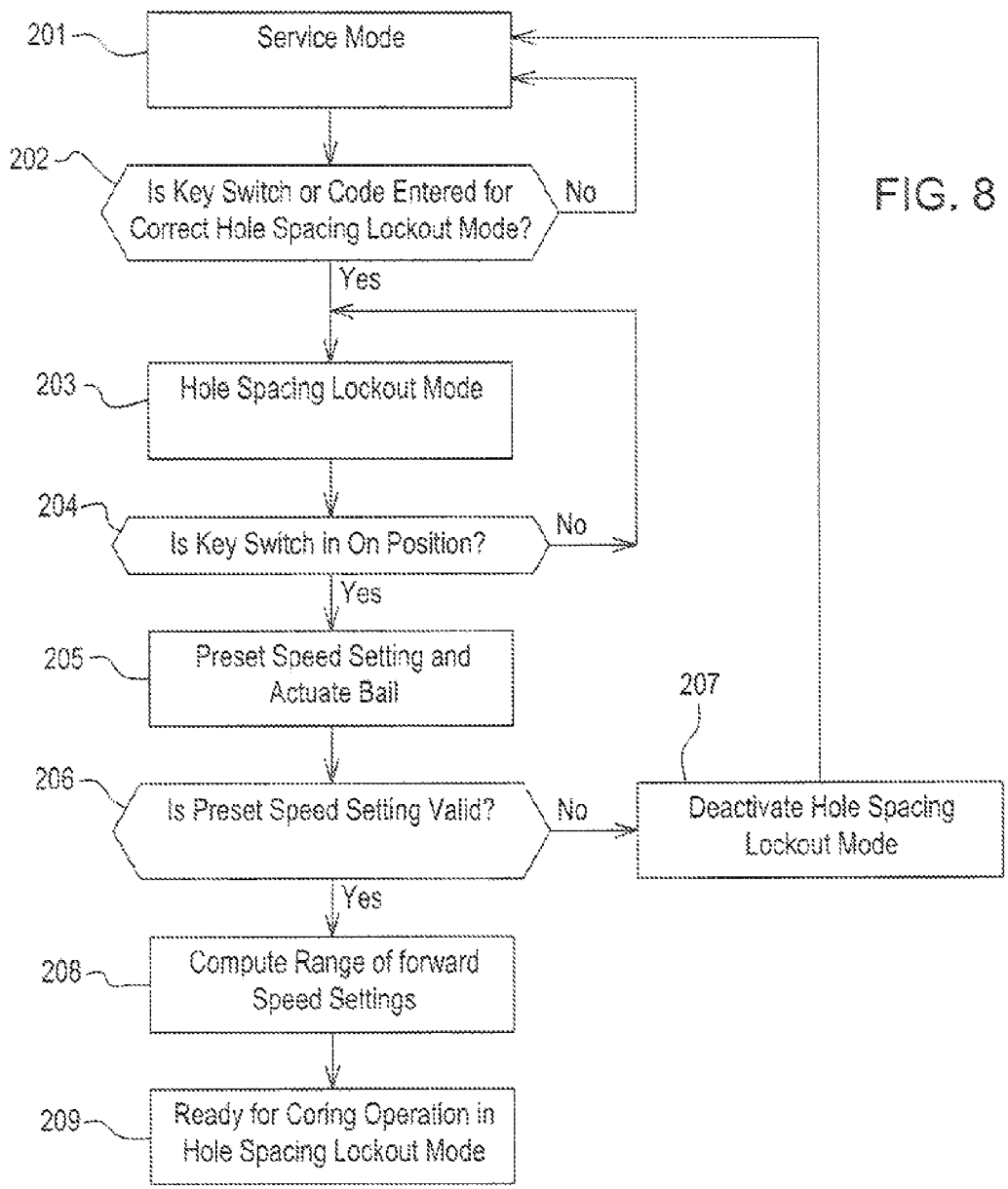
FIG. 8 is a process flow diagram for an aerator hole spacing control with lockout according an embodiment of the invention.

In one embodiment, the aerator hole spacing control with lockout may include controller 120 and the method described in the logic diagram of FIG. 8. As used herein, controller refers to any electric circuit and/or combination of electrical switches that is capable of locking out the aerator hole spacing function. For example, once a speed/hole spacing is preset or pre-programmed by a supervisor, the controller may implement the hole spacing control lockout feature by preventing the lift and lower cylinder 123 from lowering the coring head if the hole spacing control is set at any ground speed and hole spacing other than the pre-programmed or preset hole spacing position and speed, or within a limited range of the programmed settings. In other words, if an operator moves the speed and hole spacing control to any position other than the preset or pre-programmed setting, the controller may prevent operation of the coring head. For example, the controller may prevent the coring head from being lowered, and/or may command the coring head to be raised.

In one embodiment, in block 201, the aerator may be in the service mode before pre-setting the hole spacing/speed using the hole spacing control lockout feature. In block 202, the controller may check if the correct key switch or code has been entered to preset the hole spacing/speed in the hole spacing control lockout mode. For example, the code may require turning the keyswitch a specified number of times within a short time period while holding the traction bail in a specified position. If the correct code is entered, in block 203 the controller may enter the hole spacing control lockout mode. Otherwise the controller may remain in the service mode in block 201. In block 204, the controller may check if the key switch is in the on position. If the key switch is in the on position, in block 205 the supervisor or superintendent may move speed control lever 120 to the desired ground speed/hole spacing setting shown by display or dial 122 on the operator station, and actuate traction bail 116 to the forward position. When the hole spacing is preset or pre-programmed using the speed control lever and bail, an electrical sensor such as rotary potentiometer 154 or a proximity switch rotates to a position that provides a corresponding electrical signal to the controller. In block 206, the controller may check if the electrical sensor signal indicates a valid preset or pre-programmed speed/hole spacing setting. For example, valid settings of the electrical sensor may correspond to forward speeds only, not reverse or neutral. Additionally, valid settings may be limited to hole spacing between about 1 inch and about 3 inches. If the controller does not receive a valid setting, in block 207 the controller may deactivate the hole spacing control lockout feature and return to the service mode. If the setting is valid, in block 208 the controller may compute a range of forward speed settings for the electrical sensor preset position. For example, the range may be plus or minus a specified amount from the electrical sensor setting, but may not include hole spacing below 1 inch or over 3 inches, and may not extend into neutral or reverse. In block 209, the aerator is ready for coring operation in the hole spacing control lockout mode, and the controller may actuate an indicator light or LED 140 on the operator station to indicate that mode. In the hole spacing control lockout mode, hole spacing setting have been preset or pre-programmed, and operators are locked out from operating the aerator at any other hole spacing.

In one embodiment, the aerator may remain in the hole spacing control lockout mode, even if power is turned off, unless a valid key switch or code is entered to turn off that mode. Before an operator can begin the coring operation in the hole spacing control lockout mode, the controller must receive a signal from the electrical sensor that the operator has moved the speed control lever to a position within the preset range. Otherwise, the controller may prevent operation of the coring head. For example, the controller may not provide an electrical signal to actuate the lift and lower mechanism to lower the coring head unless the speed control lever is within the range of preset valid speed/hole spacing settings. Additionally, after the coring operation begins in the hole spacing control lockout mode, the controller may actuate the lift and lower mechanism to raise the coring head if the operator moves the speed control lever to a speed that is outside the preset range of valid speed/hole spacing settings.

Having described the preferred embodiment, it will become apparent that various modifications can be made without departing from the scope of the invention as defined in the accompanying claims.

The invention claimed is:

1. An aerator hole spacing control with lockout, comprising:

an aerator having a traction drive and at least three wheels,
        a neck extending therefrom with an upwardly and forwardly extending handle assembly including operator controls so that an operator may walk ahead of the aerator and steer the aerator by using the handle assembly to pivot one of the wheels about a vertical pivot axis;

a coring head mounted on the rear of the aerator carrying a plurality of tine assemblies that reciprocate up and down by rotation of a crankshaft; each tine assembly having a plurality of coring tines that are driven into the ground and produce holes for the purpose of aerating the turf;

an operator actuated speed control lever on the handle assembly;

the operator actuated speed control placing the traction drive in a position between a minimum coring speed and a maximum coring speed to change the hole spacing while the aerator moves forward and the coring head is operating;

an electrical sensor that senses the position of the speed control; and a controller electrically connected to the electrical sensor and to the coring head, the controller locking out operation of the coring head except if the electrical sensor is at a preset position.

2. The aerator hole spacing control with lockout of claim 1 wherein the electrical sensor is a potentiometer connected to the operator actuated speed control and the controller, the potentiometer providing a signal to the controller indicating the position of the speed control.

3. The aerator hole spacing control with lockout of claim 1 wherein the electrical sensor is a proximity switch connected to the operator actuated speed control and the controller, the proximity switch providing a signal to the controller indicating the position of the speed control.

4. The aerator hole spacing control with lockout of claim 1 wherein the controller provides signals to a lift and lower mechanism that lowers the coring head only if the electrical sensor is at a preset hole spacing position.

5. The aerator hole spacing control with lockout of claim 1 wherein the controller allows operation of the coring head only if the electrical sensor is within a predetermined range of the preset hole spacing position.

6. The aerator hole spacing control with lockout of claim 1 further comprising a hole spacing display on the handle assembly.

7. An aerator hole spacing control with lockout, comprising:

a hydrostatic traction drive including a pump and a plurality of wheel motors;

a control arm mounted on a control shaft of the pump that controls the direction and the speed of the pump anywhere between a minimum coring speed position and a maximum coring speed position without stopping the pump;

an electrical sensor linked to the control arm and providing electrical signals to a controller corresponding to a coring speed;

the controller locking out operation of a coring head unless the electrical signals from the electrical sensor are within a limited range of preset coring speed positions between the minimum and the maximum.

8. The aerator hole spacing control with lockout of claim 7 wherein the controller allows the coring head to be lowered to an operating position only if the electrical signals from the electrical sensor are within the limited range of preset coring speed positions.

9. The aerator hole spacing control with lockout of claim 7 wherein the controller determines if the preset coring speed positions are within a range of valid forward speeds.

10. The aerator hole spacing control with lockout of claim 6 wherein a code must be entered to preset the coring speed position and prevent operation of the aerator and other coring speed positions.

11. An aerator hole spacing control with lockout, comprising:

a traction drive including at least a pair of driven wheels and a single steered wheel;

an operator-adjustable speed control connected to a pivoting member; and a cam follower contacting the curved surface of the pivoting member to run the traction drive at any forward speed between a minimum coring speed and a maximum coring speed depending on the setting of the pivoting member, or being out of contact with the curved surface of the pivoting member to operate the traction drive in neutral or reverse; and a controller that prevents operation of a coring head on the aerator unless the coring speed is at a preset coring speed between the minimum and the maximum coring speed.

12. The aerator hole spacing control with lockout of claim 11, wherein the cam follower is on a control arm connected by a traction control cable to a traction bail.

13. The aerator hole spacing control with lockout of claim 12, wherein the control arm is mounted to a pump control shaft of a hydrostatic traction drive.

14. The aerator hole spacing control with lockout of claim 11, further comprising a potentiometer sensing the position of a pump shaft for the traction drive, and providing an electrical signal to the controller corresponding to that position.

15. The aerator hole spacing control with lockout of claim 11, further comprising a plurality of detents adjacent the curved surface of the pivoting member.

* * * * *